P. W. MARTIN.
THREAD MILLING MACHINE.
APPLICATION FILED MAY 24, 1918.
1,355,240.
Patented Oct. 12, 1920.
3 SHEETS—SHEET 1.
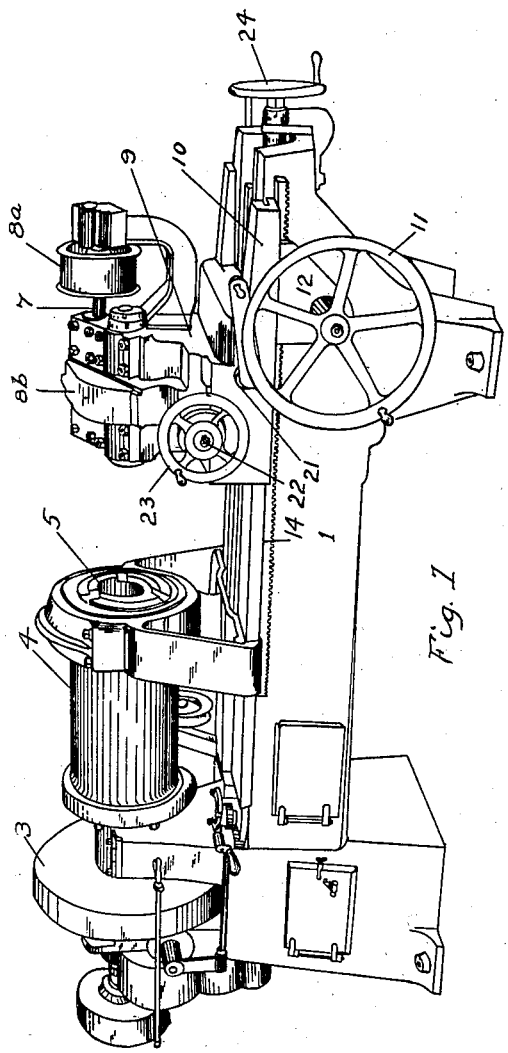
INVENTOR
Percy. W. Martin
BY
Geo. B. Willcox ATTORNEY

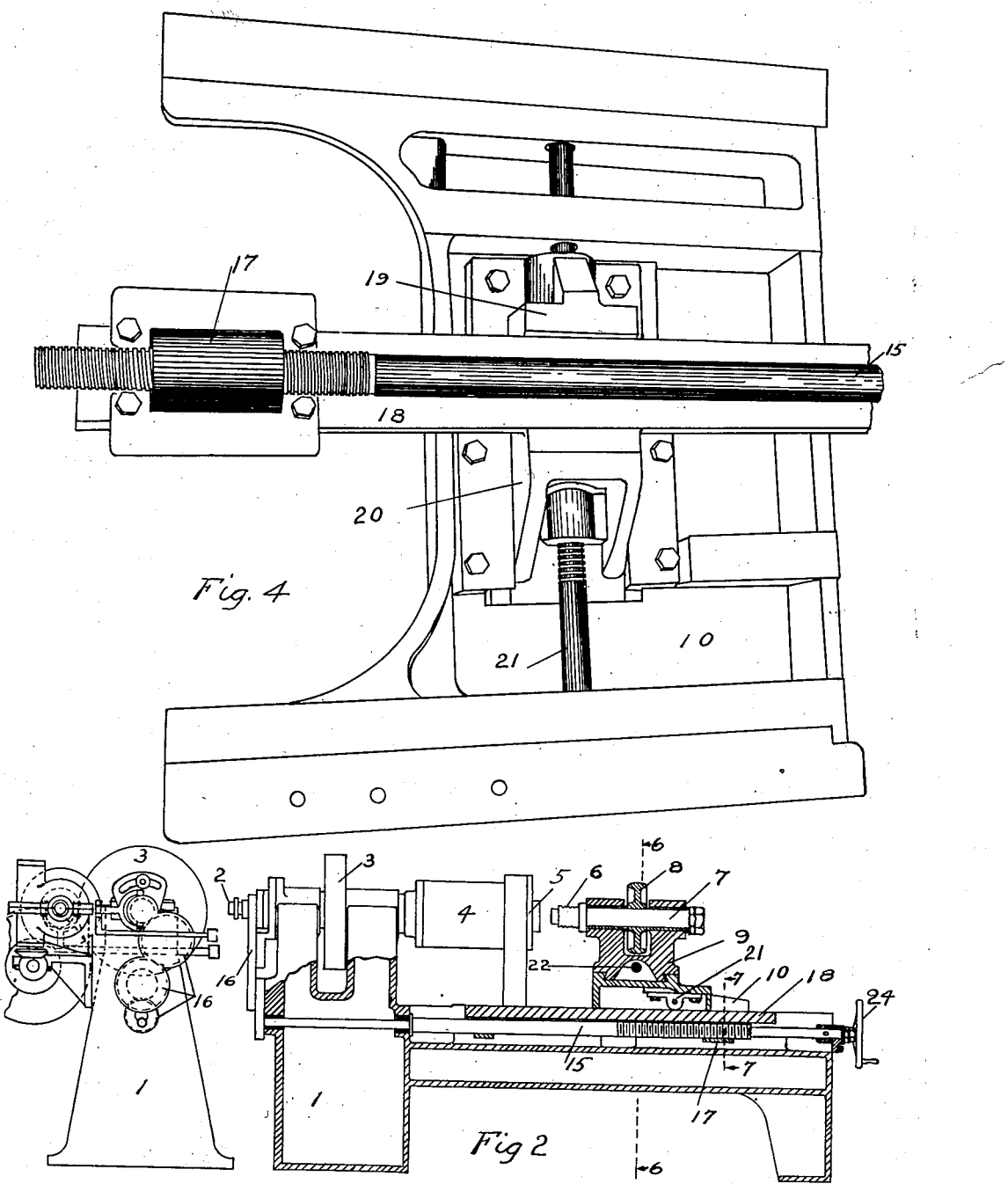

P. W. MARTIN.
THREAD MILLING MACHINE.
APPLICATION FILED MAY 24, 1918.
1,355,240.
Patented Oct. 12, 1920.
3 SHEETS—SHEET 3.
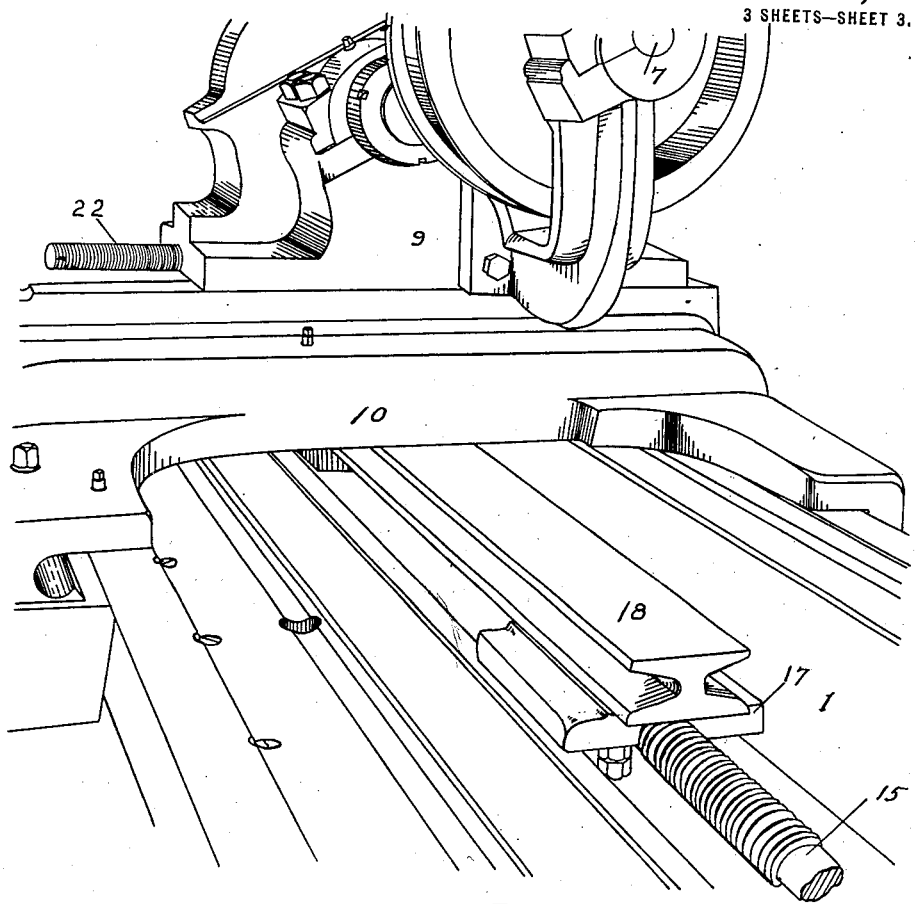
Fig. 5
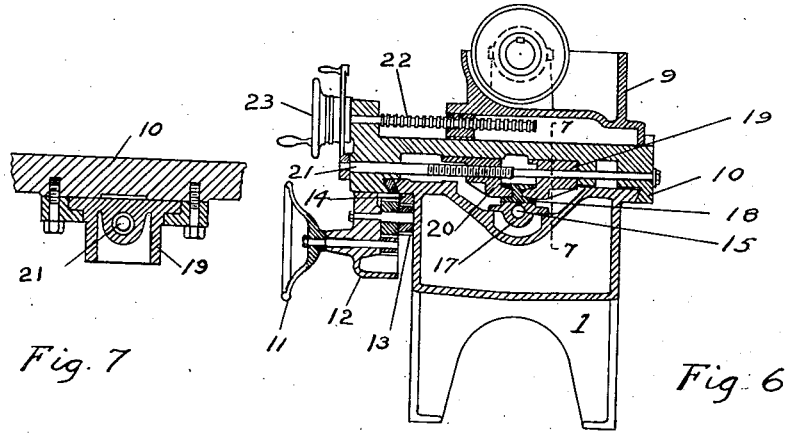
Fig. 7
Fig. 6
Percy W. Martin INVENTOR
BY
Geo. B. Willcox ATTORNEY

UNITED STATES PATENT OFFICE.

PERCY W. MARTIN, OF BAY CITY, MICHIGAN, ASSIGNOR TO SMALLEY GENERAL CO., OF BAY CITY, MICHIGAN, A CORPORATION.

THREAD-MILLING MACHINE.

1,355,240.

Specification of Letters Patent. Patented Oct. 12, 1920.

Application filed May 24, 1918. Serial No. 236,334.

*To all whom it may concern:*

Be it known that I, PERCY W. MARTIN, a citizen of the United States, residing at Bay City, in the county of Bay and State of Michigan, have invented certain new and useful Improvements in Thread-Milling Machines; and I do hereby declare the following to be a full, clear, and exact description of the invention, such as will enable others skilled in the art to which it appertains to make and use the same.

This invention relates to improvements in thread-milling machines, thread cutting lathes and the like and pertains more particularly to improved means whereby the cutting hob may be quickly and accurately advanced to and withdrawn from its operative position relative to the work to be threaded.

A further object is to provide means whereby the cutting contact of the hob with the work may be made in a positive manner without inaccuracy due to play or back-lash in the tool-feeding mechanism. The construction and arrangement of parts in my improved device, in its preferred form, also enables the number of slides or carriages necessary for the proper manipulation of the cutting tool to be reduced.

In thread-millers of the type to which my improvement is adapted, as for example, shell-threading machines, the shell or other work is slowly revolved in a chuck and the cutting hob, which is driven at any proper cutting speed independently of the work, is first run into the bore of the shell, and is then moved laterally until the teeth of the hob cut into the inner wall of the shell. While the work turns slowly through one revolution or slightly more, the cutting hob revolves and also travels lengthwise the bore of the shell a distance equal to the pitch of the thread being cut.

The means by which this lengthwise movement of the hob is accomplished in synchronism with the revolution of the work and in a positive manner, without back-lash, constitutes one of the important features of my present invention. A further advantage of my construction as herein described is that wear on the lead screw is reduced, and a large number of shells may be threaded while the lead screw is in continuous rotation, without re-setting the feed nut with relation to the lead screw.

With the foregoing and certain other objects in view which will appear later in the specification, my invention comprises the parts and combinations described and claimed herein, and the equivalents thereof.

Figure 1 is a front view of the machine.

Fig. 2 is a part longitudinal section.

Fig. 3 is an end view.

Fig. 4 is a view of the under side of the longitudinally movable tool-carrying slide.

Fig. 5 is a rear perspective view of the tool-carrying slides, broken away in part.

Fig. 6 is a transverse section on the line 6—6 of Fig. 2.

Fig. 7 is an enlarged longitudinal section through the nut, on line 7—7 of Fig. 2.

The various figures are drawn to different scales, for purpose of better illustration.

Referring to Fig. 2, the machine comprises a base 1 carrying a revoluble main spindle 2 operated by the main driving gear 3.

A work-receiving chuck 4 is carried by the main spindle 2 and the work to be threaded is received in the chuck jaws 5.

6 is a cutting hob mounted on a revoluble hob spindle 7, which, as shown in the form illustrated in Fig. 2, carries a driving pulley 8 actuated by a belt, not shown. The hob may be driven as shown in Fig. 1, by a pulley $8^a$ and suitable gears incased in a housing $8^b$.

The hob, together with its spindle and driving pulley are mounted on a transversely movable carriage 9 which in turn is mounted on a longitudinally movable slide or carriage 10.

By means of the carriage 9 the hob is traversed crosswise the bed of the machine and is moved into or away from cutting contact with the face of the work.

My improved device for successively advancing the hob into the work, internally threading the work and withdrawing the hob, will now be explained.

To move the hob toward or from the work the carriage 10 may be advanced by means of a hand wheel 11 carried by a suitable housing 12 on slide 10, this hand wheel being geared to a pinion 13—Fig. 6—that engages a rack 14 on the frame of the machine, as in ordinary lathes. The hand wheel 11 is used to rapidly move the hob lengthwise the bed of the machine when the hob is not cutting.

To feed the hob longitudinally when it is cutting, a lead screw 15 is employed. This lead screw is preferably immovable lengthwise, but is revolubly mounted in suitable bearings in the bed of the machine and is driven by a train of driving gears 16 from the main spindle 2. The screw 15 turns very slowly, depending upon the diameter and pitch of the thread in the work, and the lead screw and the chuck are synchronized by means of their gear connection 16. The hob itself revolves at any proper cutting speed.

The lead screw carries an internally threaded nut 17. A longitudinal bar 18, which I term a wedge-bar which may be of any suitable cross section, although preferably I-shaped, with wedge flanges, extends as shown in Figs. 4, 5 and 6, lengthwise the machine and in proximity to and parallel with the lead screw. The wedge-bar or its equivalent is preferably fixed to the nut 17 and is adapted to be releasably engaged by a pair of jaws 19 and 20 preferably mounted on the under side of the longitudinally movable carriage 10. One of these jaws, as 19, is fixed to the carriage and the other, as 20, is adapted to releasably engage the opposite side of the wedge-bar 18, being actuated by a lever-operated screw 21. When jaw 20 is clamped to the wedge-bar, the carriage 10 moves with the nut 17 and when the jaw is released the carriage remains stationary, although the screw 15 continues to rotate and its nut 17 and the wedge-bar 18 continue to move lengthwise the bed. Thus when screw 21 is tightened the revolving hob is fed lengthwise the opening in the work at a rate of feed corresponding to the pitch of the thread to be cut in the work.

To move the hob transversely so as to bring the teeth of the hob into cutting engagement with the inner wall of the work I employ a micrometer screw 22 operated by a hand wheel 23, whereby the carriage 9 is moved gradually into its predetermined position.

The operation of the machine is as follows: The work to be internally threaded, as a shell, having been inserted in the chuck is rotated by the main drive gear 3. The bottom slide or carriage 10 is then advanced to the work by the hand wheel 11. When the hob 6 has entered the opening in the work the movable jaw 20 is clamped to the wedge-bar 18 by means of screw 21. The hob then feeds lengthwise, meanwhile revolving at its proper cutting speed.

The hob carriage 9 is next moved transversely to bring the hob teeth into cutting engagement with the inner face of the work by means of the hand wheel 23 and micrometer screw 22. The chuck 4 and the work revolve preferably one complete revolution after the hob has attained its proper cutting depth and during that time the lead screw 15 revolves the proper amount and the hob progresses a distance equal to the pitch of the thread.

By properly changing the ratios of the train of gears 16, these relative speeds can be varied to suit different threads to be cut.

The cut being completed, the hob teeth are backed out of engagement with the work by the micrometer screw 22. The longitudinally movable carriage 10 is disengaged from the wedge-bar 18 by means of the screw 21, and carriage 10 is then moved back by means of the hand wheel 11 to withdraw the hob from the opening in the work.

While the machine is in motion, whether cutting or not, the lead screw 15 is revolving and the nut 17 is gradually moving lengthwise the lead screw, although at a very slow rate. After a time, however, the nut 17 approaches the end of the thread on screw 15. The wedge-bar then may be quickly returned to its original position by disengaging the train of gears 16 and rapidly revolving the lead screw 15 by the hand crank 24.

If through inadvertence the wedge-bar is not returned when the nut reaches the end of the thread on the lead screw, the nut will run off the thread and the lead screw will turn idly.

By the means above described, I have produced a feed device for thread-milling machines in which the lead screw is continually revolving in one direction while the machine is working. Back-lash is thereby eliminated and wear on the lead screw threads is reduced because the construction enables a lead screw of very long thread to be employed and no one part of the lead screw is subjected to excessive wear.

In this specification the broader aspects of my invention are set forth and claimed. Various specific embodiments of the invention may be employed in the construction of various machines built according to my present invention, as for example, the construction shown and described in my copending application, Serial No. 390,845 and the equivalents thereof.

While I have shown and described the wedge-bar 18 as being operatively connected to the nut 17 and releasably clamped to the carriage 10, it is obvious that the wedge-bar may if desired be operatively connected to the carriage 10 and releasably clamped to the nut 17, without departing from my invention, as expressed in the claims.

Having thus described my invention, what I claim and desire to secure by Letters Patent is:

1. In a machine of the class described, the combination of a frame, a revoluble work-receiving chuck on said frame, a revolubly mounted lead screw, driving mechanism operatively connecting said chuck and lead screw, a carriage longitudinally movable on said frame, a transversely movable carriage on said longitudinal carriage, a revoluble cutting hob on said transverse carriage, a traveling nut threaded on said lead screw, a longitudinally movable bar disposed in proximity to and parallel with said lead screw, and fastening means adapted to releasably engage said bar to operatively connect said nut and said longitudinal carriage.

2. In a machine of the class described, the combination of a frame, a revoluble work-receiving chuck on said frame, a revolubly mounted lead screw, driving mechanism operatively connecting said chuck and lead screw, a carriage longitudinally movable on said frame, a cutting tool on said carriage, a traveling nut threaded on said lead screw, a longitudinally movable bar operatively connected to said nut and disposed in proximity to and parallel with said lead screw, and clamping means adapted to releasably clamp said longitudinally movable carriage and said bar together.

3. In a machine of the class described, the combination of a frame, a revoluble work-receiving chuck on said frame, a revolubly mounted lead screw, driving mechanism operatively connecting said chuck and lead screw, a carriage longitudinally movable on said frame, a cutting tool on said carriage, a traveling nut threaded on said lead screw, and means, including a longitudinally movable bar disposed in proximity to and parallel with said lead screw adapted to releasably connect said longitudinally movable carriage and said traveling nut together.

4. In a thread milling machine, the combination of a frame, a revoluble work-receiving chuck on said frame, a revolubly mounted lead screw, driving mechanism operatively connecting said chuck and lead screw, a carriage longitudinally movable on said frame, a transversely movable carriage on said longitudinal carriage, a revoluble cutting hob on said transverse carriage, a traveling nut threaded on said lead screw, a longitudinally movable bar fixed to said nut and disposed in proximity to and parallel with said lead screw, and clamping means adapted to releasably clamp said longitudinal carriage and said bar together.

PERCY W. MARTIN.